Figure 1A:
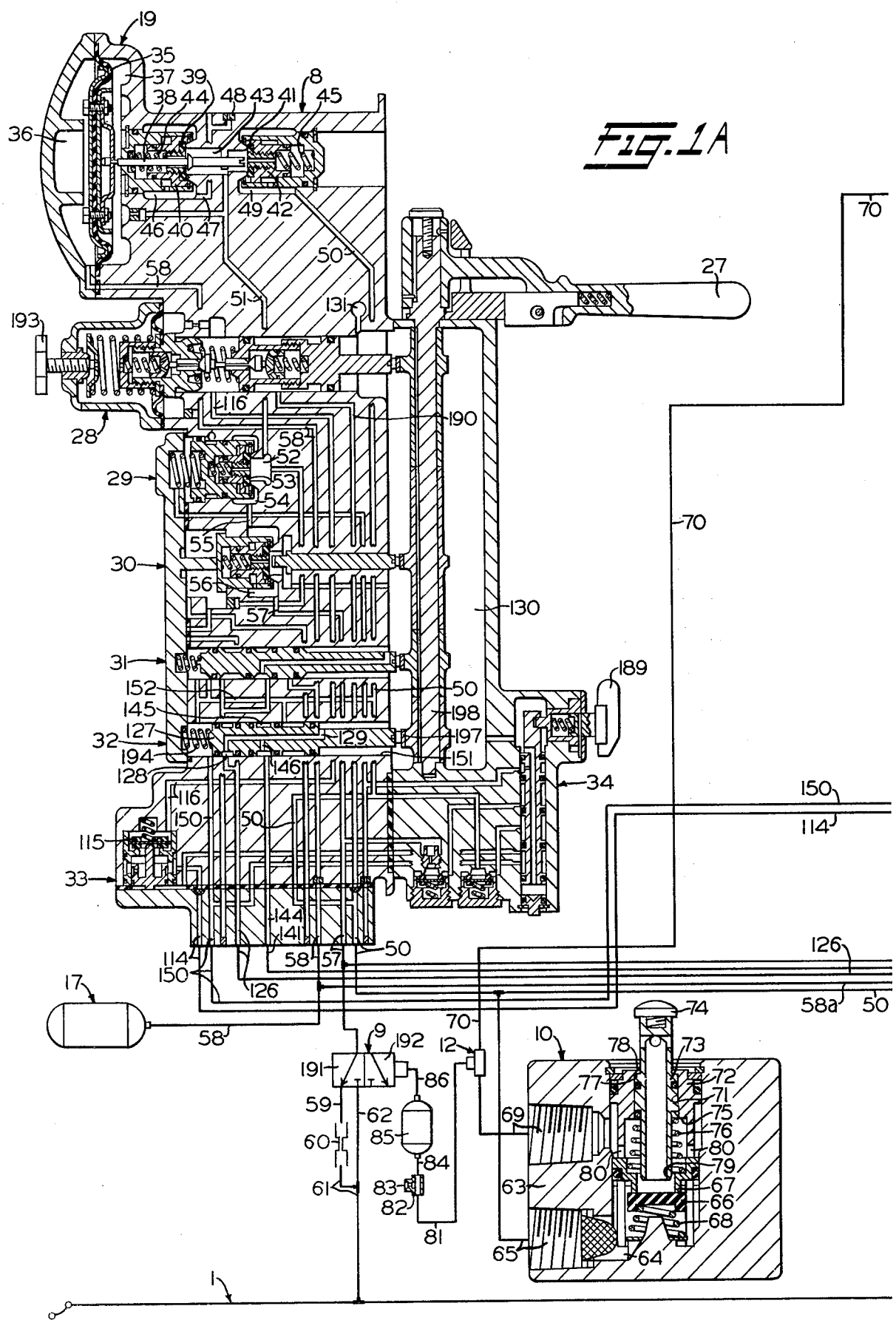

United States Patent [19]
Walley

[11] 3,982,791
[45] Sept. 28, 1976

[54] BRAKE APPARATUS TO PROVIDE POWER CUT OFF AND A SERVICE BRAKE APPLICATION UPON TRAIN SEPARATION

[75] Inventor: Esmet Walley, McKeesport, Pa.

[73] Assignee: Westinghouse Air Brake Company, Wilmerding, Pa.

[22] Filed: Oct. 16, 1975

[21] Appl. No.: 622,880

[52] U.S. Cl. .................................. 303/3; 303/67
[51] Int. Cl.² ...................................... B60T 13/70
[58] Field of Search ............... 303/2, 3, 15–18, 303/20, 35, 37, 66, 67

[56] References Cited
UNITED STATES PATENTS

| | | |
|---|---|---|
| 1,430,893 | 10/1922 | Farmer .................................. 303/66 |
| 1,473,758 | 11/1923 | Farmer .................................. 303/67 |
| 1,816,078 | 7/1931 | Farmer .................................. 303/67 |
| 2,165,988 | 7/1939 | Stewart ................................. 303/66 |
| 2,937,906 | 5/1960 | May ......................................... 303/3 |
| 3,208,801 | 9/1965 | McClure .............................. 303/36 |

*Primary Examiner*—Duane A. Reger
*Attorney, Agent, or Firm*—W. F. Poore; R. W. McIntire, Jr.

[57] ABSTRACT

This invention relates to locomotive brake control apparatus operable responsively to a reduction of the pressure in a train brake pipe as a result of train separation at a location in the train remote from the locomotive to cause cut off of the locomotive power supply, cut out of dynamic brakes, sanding of the rails, and a service brake application on the entire train.

12 Claims, 2 Drawing Figures

BRAKE APPARATUS TO PROVIDE POWER CUT OFF AND A SERVICE BRAKE APPLICATION UPON TRAIN SEPARATION

BACKGROUND OF THE INVENTION

The brake control equipment on most locomotives presently in use on American railroads embody a charging cut-off pilot valve device normally operable responsively to an emergency rate of reduction of pressure in the train brake pipe to cause the supply of fluid under pressure to (1) the brake pipe cutoff valve of the brake valve thereby effecting closing of this cut-off valve to render the relay valve of the brake valve ineffective to supply fluid under pressure to the train brake pipe, (2) the power cut-off switch to cut off the propulsion power of the locomotive, (3) the dynamic brake cut-out switch to cut out the dynamic brakes, and (4) the sanding equipment to cause sanding of the rails. Consequently, the car control valve, if of the usual type which includes both a service portion and an emergency portion that embodies a brake pipe vent valve for venting fluid under pressure from the brake pipe at a fast rate, on each car in the train, and also the control valve on the locomotive, thereupon operates in response to the emergency rate of reduction of pressure occurring in the train brake pipe to effect an emergency brake application on the respective vehicle in the train. However, it has been found that if cars hauled by the locomotive are provided with a control valve that does not have the above-described emergency portion that embodies a brake pipe vent valve, such as is the case with many control valves of foreign manufacture, the rate of reduction of pressure in the train brake pipe, subsequent to a train separation at a location remote from the locomotive, is less than an emergency rate. Therefore, the charging cut-off pilot valve device is inoperative to cause (1) closing of the brake pipe cut-off valve, (2) cut off of propulsion power, (3) dynamic brake cut out and (4) rail sanding.

Accordingly, it is the general purpose of this invention to provide a brake control apparatus for locomotives used to haul cars that are provided with control valves that do not have an emergency portion having a brake pipe vent valve, that embodies means manually controlled by the engineer to provide fast charging of the train brake pipe and thereafter restricted flow of fluid under pressure to the brake pipe, and means automatically operable, while the flow to the train brake pipe is so restricted, in response to a train separation to cause (1) cut off of propulsion power, (2) dynamic brake cut out (3) rail sanding and (4) a service brake application on the locomotive and all the cars in the train, irrespective of the type of control valve provided on the locomotive and cars, unless suppressed by the engineer.

SUMMARY OF THE INVENTION

According to the present invention, a locomotive brake control apparatus embodies therein manually operable means selectively operable by the engineer to enable restricted or unrestricted supply of fluid under pressure from the relay valve of an engineer's automatic brake valve to the train brake pipe and means automatically operable in response to a chosen reduction of pressure in the train brake pipe, while the supply of fluid under pressure thereto is restricted, as a result of a train separation to effect (1) cut off of locomotive propulsion power, (2) cut out of the dynamic brakes, (3) sanding of the rails and (4) a service brake application on the entire train unless suppressed by the engineer manually operating the automatic brake valve to effect a brake application on the entire train.

Figure 1B:
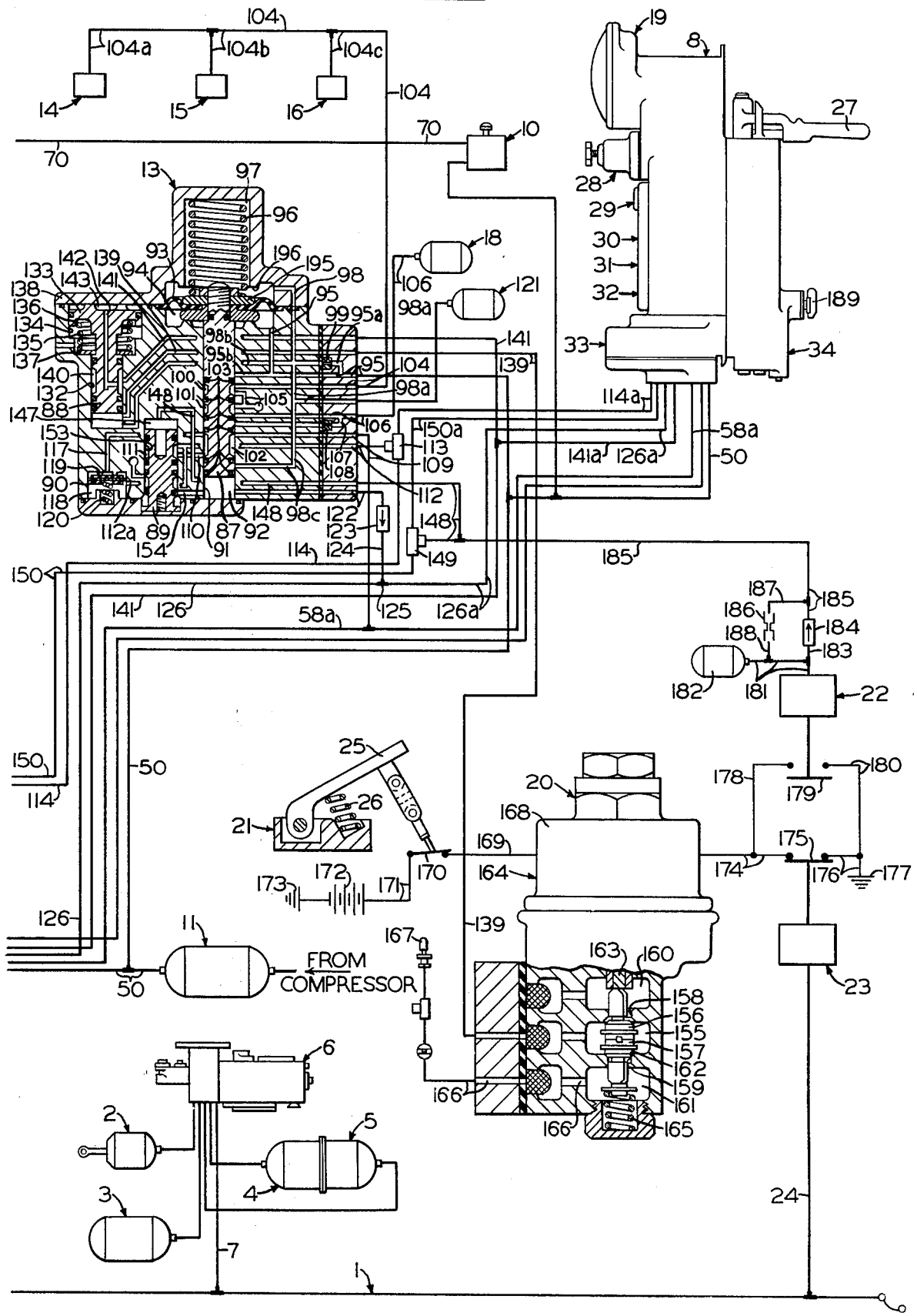

In the accompanying drawings:

FIG. 1A and FIG. 1B, when taken together such that the right-hand edge of FIG. 1A is matched with the left-hand edge of FIG. 1B, constitute a diagrammatic view of a locomotive brake control apparatus embodying the invention.

DESCRIPTION

Referring to the drawings, the locomotive fluid pressure brake control apparatus embodying the invention comprises a brake pipe 1 that extends from the locomotive back through each car in the train, a brake cylinder 2, an auxiliary reservoir 3, a service volume reservoir 4, a control reservoir 5, a brake control valve device 6 that is connected to the brake pipe 1 by a branch pipe 7, two identical engineer's automatic brake valve devices 8, one located at each end of the locomotive and both connected to the brake pipe 1 via a fluid pressure operated three-way valve device 9, and two identical manually operated push-button type valve devices 10, one located adjacent each of the brake valve devices 8, to enable the engineer, when operating the locomotive from either end thereof, to effect the supply of fluid under pressure from a main reservoir 11 to the fluid pressure operated three-way valve device 9 via a double check valve device 12.

In order to provide for cut off of the locomotive power supply, cut out of the dynamic brakes and sanding of the rails upon train separation or break-in-two at a location in the train remote from the locomotive, the locomotive fluid pressure brake control apparatus embodying the invention further comprises a brake application valve device 13 operable upon the occurrence of a break-in-two of the train to effect the supply of fluid under pressure from the main reservoir 11 to a power cut-off switch device 14, a dynamic brake cut-out switch device 15, and a fluid pressure operated switch device 16 which, when closed causes operation of the rail sanding apparatus.

Moreover, this brake application valve device 13 is also operative upon the occurrence of a break-in-two of the train to establish a communication between an equalizing reservoir 17 and a reduction reservoir 18, the size of which is such as to reduce the pressure in the equalizing reservoir 17, upon equalization of pressure in the two reservoirs 17 and 18, sufficiently to cause a relay valve 19 of that one of the brake valve devices 8 being used to control the brakes on the train to operate to reduce the pressure in the brake pipe 1 the required amount to cause the brake control valve 6 on the locomotive and the brake control valves on the cars in the train to effect a service brake application on the locomotive and each car.

In order to effect venting of fluid under pressure from the brake application valve device 13 to cause operation thereof, the brake control apparatus constituting the present invention also includes a magnet valve device 20. Disposed in series in the circuit for energizing the magnet valve device 20 is a foot-pedal-operated switch device 21 and two fluid pressure operated switch device 22 and 23 arranged in parallel. For reasons hereinafter made apparent, the characteristics of these pressure switch devices 22 and 23 are such that both the opening and closing pressure of the switch device 22 are higher than the closing pressure of the switch device 23. Moreover, the opening pressure of the switch device 23 is less than the closing pressure of this switch device. These switch devices may be commercially available items such as class 9012 pressure switches manufactured by Square D Company, Asheville, North Carolina.

The pressure switch device 23 is connected by a pipe 24 to the brake pipe 1. Accordingly, it is apparent from the drawings that the magnet valve device 20 is deenergized either in response to the engineer becoming incapacitated so that he is unable to maintain a foot pedal 25 of the switch device 21 depressed against the yielding resistance of a spring 26, or a chosen reduction of pressure in the brake pipe 1 as the result of a break-in-two or some other cause.

The pressure switch 22 enables the engineer to suppress a service brake application effected by operation of the brake application valve device 13 by moving a handle 27 of the brake valve device 8 at the end of the locomotive from which brake control is effected to a brake application position.

Each of the engineer's automatic brake valve devices 8 may be of the self-lapping type such as that disclosed in U.S. Pat. No. 2,958,561, issued Nov. 1, 1960, to Harry C. May, and assigned to the assignee of the present application.

Each brake valve device 8 comprises the hereinbeforementioned relay valve 19, a self-lapping regulating or control valve 28, a brake pipe cut-off valve 29, a vent valve 30, an emergency valve 31, a suppression valve 32, an equalizing reservoir cut-off valve 33, and a manually positionable selector valve 34.

Considering the engineer's brake valve device 8 shown in FIG. 1A, the relay valve 19 comprises a diaphragm 35 which is subject opposingly to fluid pressures in a chamber 36 and a chamber 37 and is adapted through the medium of a coaxially arranged operating stem 38 to effect unseating of a disc-shaped exhaust valve 39 carried by an annular valve member 40 or to effect unseating of a disc-shaped supply valve 41 carried by a coaxially arranged annular valve member 42, according to whether the pressure in chamber 36 is less than or exceeds the pressure in the chamber 37. The operating stem 38 is coaxially connected to the chamber 37 side of the diaphragm 35 and projects centrally through the annular valve member 40 and through a chamber 43 and is adapted to abut the left-hand face of the disc-shaped supply valve 41. Springs 44 and 45 respectively urge the valve members 40 and 42 toward each other for normally concurrently seating the valves 39 and 41. The exhaust valve 39 controls communication between the chamber 43 and a chamber 46 which is open to atmosphere via an exhaust passageway 47 having therein an exhaust choke 48, whereas supply valve 41 controls communication between the chamber 43 and a chamber 49 that is always open to the main reservoir 11 via a passageway and correspondingly numbered pipe 50.

The chamber 43 is connected via a passageway 51 to a chamber 52 in the brake pipe cut-off valve 29. As fully described in the hereinbefore-mentioned U.S. Pat. No. 2,958,561, the brake pipe cut off valve 29 comprises a valve 53 that controls communication from the chamber 52 to a chamber 54 which is connected to the three-way valve device 9 via a passageway 55, a chamber 56 in the hereinbefore-mentioned vent valve 30 and a passageway and correspondingly numbered pipe 57.

The chamber 36 at the left-hand side of the diaphragm 35 is connected by a passageway and correspondingly numbered pipe 58 to the hereinbefore-mentioned equalizing reservoir 17, it being noted from the drawings that a branch pipe 58a connects the pipe 58 to a passageway (not shown) in the brake valve device 8 shown in FIG. 1B which passageway opens into the chamber 36 of the relay valve 19 of this brake valve device.

The equalizing reservoir 17 is charged with fluid under pressure by operation of the self-lapping control valve 28 of either brake valve device 8 under the control of the equalizing reservoir cut-off valve 33 of the respective brake valve device and the hereinbefore-mentioned brake application valve device 13 in the same manner as described in the above-mentioned U.S. Pat. No. 2,958,561.

The operation of the control valve 28, brake pipe cut-off valve 29, vent valve 30, emergency valve 31, suppression valve 32, equalizing reservoir cut-off valve 33 and selector valve 34 are the same as is described for these corresponding devices in the hereinbefore-mentioned U.S. Pat. No. 2,958,561. Therefore, a detailed description of the operation of these valves is not deemed necessary except where one or more of these valves effect operation of the apparatus constituting the present invention.

The fluid pressure operated three-way valve device 9 (FIG. 1A) may be such as, for example, a three-way, two-position spool-type valve device as shown and described on pages 7 and 19 of Publication A4-78.00, issued June, 1968, by the Fluid Power Division of Westinghouse Air Brake Company, 1953 Mercer Road, Lexington, Kentucky, U.S.A., a subsidiary of American Standard, Incorporated.

The hereinbefore-mentioned pipe 57 is connected to an inlet port of the fluid pressure operated three-way valve device 9 which has two outlet ports. In the absence of the supply of fluid under pressure to the three-way valve device 9 in a manner hereinafter explained, a spring (not shown) biases a spool valve (not shown) to a first position in which a communication is established between the inlet port, to which the pipe 57 is connected and one of the outlet ports to which is connected one end of a pipe 59 the opposite end of which is connected to the inlet of a fixed resistance or choke 60. The outlet of this choke 60 is connected to the brake pipe 1 by a pipe 61.

Connected to the other outlet port of the three-way valve device 9 is one end of a pipe 62 that has its other end connected to the pipe 61 intermediate the ends thereof. Upon the supply of fluid under pressure to the valve device 9 in the manner hereinafter explained, the spool valve will be shifted against the yielding resistance of the spring from its first position to its second position in which the communication between the pipe 56 and the pipe 59 is closed and a communication is established between the pipe 57 and the pipe 62. Thus, in this second position of the three-way valve device 9, a direct, unrestricted communication is established between the pipe 57 and the brake pipe 1 in bypassing relation to the choke 60 to enable rapid charging of the train brake pipe by the relay valve 19 of the brake valve device 8 at the operating end of the locomotive.

Each of the manually operated push button valve devices 10 may be such as, for example, a three-way normally closed panel-mounted valve such as shown and described on pages 2 and 3 of Publication A4-74.14, issued June, 1966, by the Fluid Power Division of Westinghouse Air Brake Company.

One of the manually operated push button valve devices 10 is shown in cross-section in FIG. 1A. Accordingly, by reference to the valve device 10 shown in FIG. 1A, it will be seen that each valve device 10 comprises a casing 63 having therein a supply chamber 64 that is connected by a passageway and correspondingly numbered pipe 65 to the hereinbefore-mentioned pipe 50 intermediate the ends thereof. Since the pipe 50 is connected to the main reservoir 11, the chamber 64 is constantly supplied with fluid under pressure from the main reservoir 11. Disposed in the chamber 64 is a flat disc-type valve 66 that is normally biased against an annular inlet valve seat member 67 by a spring 68 interposed between the valve 66 and the bottom of the chamber 64 to close communication between this chamber 64 and an outlet passageway and correspondingly numbered pipe 69 that is connected to the lower inlet of hereinbefore-mentioned doubled check valve 12. The upper inlet of this double check valve 12 is connected by a pipe 70 to the corresponding outlet passageway of the manually operated push button valve device 10 shown on FIG. 1B of the drawings.

As shown in FIG. 1A, slidably mounted in a bore 71 in a bushing 72 is a hollow plunger 73 that has a push buttom 74 secured to its upper end.

Formed on the plunger 73 is a lower shoulder 75 between which and the valve seat member 67 is interposed a spring 76 that is disposed in surrounding relation to the plunger 73. This spring 76 is normally effective to bias an upper shoulder 77 on the plunger 73 against an inturned flange 78 that is formed integral with the bushing 72 at the upper end of bore 71.

While the spring 76 biases the upper shoulder 77 on the hollow plunger 73 of each valve device 10 against the corresponding inturned flange 78, the lower end of the plunger 73, which constitutes an exhaust valve seat 79, is disposed above the upper face of the valve 66. Consequently, the outlet port of each valve device 10 is open to atmosphere via a pair of ports 80 in the bushing 72 and the hollow plunger 73.

As shown in FIG. 1A, the outlet of the double check valve 12 is connected by a pipe 81 to one end of a pipe tee 82 that has a side outlet in which is secured a choke 83 that is open to atmosphere.

Connected to the other end of the pipe tee 82 is one end of a pipe 84 that has its other end connected to the lower end of a volume reservoir 85. Connected to the upper end of the volume reservoir 85 is one end of a pipe 86 the opposite end of which is connected to the piston end of the fluid pressure operated three-way valve device 9. This valve device 9 is provided with a piston (not shown) that is effective, when fluid under pressure is supplied to one face thereof via the pipe 86, to shift the spool valve of this valve device 9 against the yielding resistance of a spring (not shown) from its first position to its second position.

The brake application valve device 13 (FIG. 1B) comprises a sectionalized casing containing an application valve 87, a suppression valve 88, a release control valve 89 and a check valve 90.

The application valve 87 is of the spool type and is reciprocable in a bore 91 formed in the sectionalized casing of the valve device 13. A chamber 92 is formed at the lower end of application valve 87 by its cooperative relationship with the wall of the bore 91. The opposite end of the application valve 87 is connected to a diaphragm 93 which is subject on its lower side to fluid under pressure in a chamber 94 that is constantly open to the main reservoir 11 via a passageway and correspondingly numbered pipe 95 that is connected to the pipe 50 intermediate the ends thereof, it being remembered that pipe 50 is connected to the main reservoir 11. The diaphragm 93 is subject on its upper side to the force of a heavy spring 96 and fluid under pressure in a chamber 97 that is constantly open via a passageway 98, a choke 99 and a branch passageway 95a to the passageway 95 that is connected to the main reservoir 11, as explained above.

Intermediate its ends, the application valve 87 is provided with three spaced-apart peripheral annular grooves 100, 101 and 102 which are sealingly separated one from the other by O-ring seals 103, there being two of these O-ring seals adjacent each end of the peripheral annular groove 102. The spring 96 is of such strength as to maintain application valve 87 in the normal position in which it is shown in FIG. 1B so long as pressure in the chamber 94 does not exceed the pressure in the chamber 97 by more than a preselected degree, such as, for example, thirty-five pounds per square inch.

While the valve 87 occupies the position shown in FIG. 1A, the groove 100 thereon connects a passageway and correspondingly numbered pipe 104 to an atmospheric vent passageway 105. The pipe 104 is connected respectively to the power cut-off switch device 14, dynamic brake cut-out switch device 15 and sanding switch device 16 by branch pipes 104a, 104b and 104c. Therefore, while the valve 87 occupies the position shown, fluid under pressure is vented from the switch devices 14, 15 and 16.

Also, while the valve 87 occupies the position shown, the groove 101 thereon connects one end of a passageway and correspondingly numbered pipe 106 to the vent passageway 105. The other end of the pipe 106 is connected to the hereinbefore-mentioned reduction reservoir 18. Consequently, the reduction reservoir 18 is vented to atmosphere while valve 87 occupies the position shown in FIG. 1B.

opening into the passageway 106 intermediate the ends thereof is one end of a passageway 107 that has a choke 108 therein. The opposite end of the passageway 107 opens at the wall surface of the bore 91 below the location at which the one end of the passageway 106 opens at this wall surface.

The groove 102 on valve 87 connects one end of a passageway and correspondingly numbered pipe 109 that has its opposite end connected to the pipe 58a intermediate the ends thereof, to one end of a passageway 110 the opposite end of which is connected by a peripheral annular groove 111 formed on the release control valve 89, which also is of the spool type, to one end of a passageway and correspondingly numbered pipe 112 the opposite end of which is connected to the outlet of a double check valve 113. Connected to the lower inlet of the double check valve 113 is one end of a pipe 114 the opposite end of which is connected to a correspondingly numbered passageway in the left-hand brake valve device 8 shown in FIG. 1A. As is explained in detail in hereinbefore-mentioned U.S. Pat. No. 2,958,561, this passageway 114 is open past a check valve 115 in the equalizing cut-off valve 33 to one end of a passageway 116 that leads to the outlet of the control valve 28 of this brake valve device 8.

Connected to the upper end of the double check valve 113 is one end of a pipe 114a the opposite end of which is connected to a corresponding passageway that is connected to the outlet of the control valve 28 of the brake valve 8 shown in FIG. 1B.

The groove 102 on the brake application valve 87 also connects, while this valve 87 is in the position shown in FIG. 1B, the passageway 109 to a passageway 117 which leads to the inner seated area of the hereinbefore-mentioned check valve 90 that is disposed in a chamber 118 and biased against an annular valve seat 119 by a spring 120. The chamber 118 has opening thereinto one end of a branch passageway 112a, the opposite end of which is connected to the passageway 112.

The hereinbefore-mentioned passageway 95 in the sectionalized casing of the valve device 13 has a branch passageway 95b that opens at the wall surface of the bore 91. This end of the branch passageway 95b is closed by the valve 87 while it is in the position shown in FIG. 1B.

The passageway 98 in the sectionalized casing of valve device 13 has two branch passageways 98a and 98b. The branch passageway 98a is connected by a pipe bearing the same numeral to a timing reservoir 121. A third branch passageway 98c opens at one end into the branch passageway 98a and at the other end at the wall surface of the bore 91 at a point spaced above the location at which a passageway and correspondingly numbered pipe 122 opens at the wall surface of this bore. The pipe 122 is connected to the inlet of a check valve 123 the outlet of which is connected by a pipe 124 to the side outlet of a pipe tee 125. Connected to the left-hand inlet of the pipe tee 125 is one end of a pipe 126 that is connected to a correspondingly numbered passageway in the brake valve device 8 shown in FIG. 1A.

As explained in hereinbefore-mentioned U.S. Pat. No. 2,958,561, while a spool-type valve 127 of the suppression valve 32 of the brake valve device 8 is in its release position in which it is shown, the passageway 126 is open to atmosphere via a groove 128 on and a passageway 129 in the spool valve 127, a chamber 130 and a vent passageway 131.

Connected to the right-hand inlet of the pipe tee 125 (FIG. 1B) is one end of a pipe 126a the opposite end of which is connected to a passageway in the brake valve device 8 shown in FIG. 1B, it being understood that this passageway is open to atmosphere since the two brake valve devices 8 at the respective opposite ends of the locomotive are identical in construction.

The branch passageway 98b extends through the sectionalized casing of the valve device 13 and opens at the surface of a bottomed bore 132 therein adjacent the lower end thereof.

The hereinbefore-mentioned suppression valve 88 is slidably mounted within the bottomed bore 132 and has formed integral therewith at its upper end a piston 133 that is slidably mounted in a counterbore 134 coaxial with the bottomed bore 132. The piston 133 is subject on its lower side to the force of a spring 135 which is disposed in an atmospheric chamber 136 and interposed between the lower side of this piston 133 and an annular spring seat 137. This spring 135 is normally effective to bias the upper side of the piston 133 into contact with a cover member 138 that is secured to the sectionalized casing of the valve device 13.

Opening at the wall surface of the bottomed bore 132 just above the location at which the branch passageway 98b opens at this wall surface and below the end of the suppression valve 88, while in the position shown, is one end of a passageway 139 that is connected by a correspondingly numbered pipe to the hereinbefore-mentioned magnet valve device 20. Consequently, fluid under pressure that flows from the main reservoir 11 through pipe 50, pipe and passageway 95, branch passageway 95a, choke 99, passageway 98 and branch passageway 98b to the interior of the bottomed bore 132, flows therefrom to the magnet valve device 20 via the passageway and pipe 139.

While the suppression valve 88 occupies the position shown in FIG. 1B, a peripheral annular groove 140 formed thereon connects a passageway 141 to a passageway 142 that extends through this valve 88 and the piston 133 to a chamber 143 above this piston 133. The passageway 141 is connected by a pipe bearing the same numeral to one end of a passageway 144 in the brake valve device 8 shown in FIG. 1A.

As shown in FIG. 1A, the other end of the passageway 144 registers with a second peripheral annular groove 145 provided on the spool valve 127. A port 146 in the valve 127 connects the groove 145 to the hereinbefore-mentioned passageway 129 in this valve 127.

From the foregoing, it is apparent that the chamber 143 (FIG. 1B) above the piston 133 is normally open to atmosphere via passageway 142, groove 140, passageway and pipe 141, passageway 144 (FIG. 1A), groove 145 on and port 146 and passageway 129 in valve 127, chamber 130 and vent passageway 131.

A pipe 141a that at one end is connected to the pipe 141 intermediate the ends thereof is likewise open to atmosphere through the brake valve device 8 shown in FIG. 1B.

Opening into a chamber 147 above the hereinbefore-mentioned release control valve 89 is one end of a passageway 148 that extends through the sectionalized casing of valve device 13 and is connected by a correspondingly numbered pipe to the outlet of a double check valve 149. As shown in FIG. 1B, connected to the lower inlet of the double check valve 149 is one end of a pipe 150 that is connected to a correspondingly numbered passageway in the brake valve device 8 shown in FIG. 1A.

While the suppression valve 127 occupies its release position shown in FIG. 1A, the passageway 150 opens at the wall surface of a bore 151, in which valve 127 is slidable mounted, at a location that is at the left-hand end of this valve 127.

Moreover, as shown in FIG. 1A, a passageway 152 in the brake valve device 8 opens at one end into the passageway 50, which is connected to the main reservoir 11 by the correspondingly numbered pipe, and at the opposite end into the bore 151 adjacent the left-hand end thereof. Therefore, while the suppression valve 127 occupies its release position in which it is shown, fluid under pressure flows from the main reservoir 11 to the chamber 147 above the release control valve 89 via pipe and passageway 50, passageway 152, bore 151, passageway and pipe 150, double check valve 149, and pipe and passageway 148 to maintain the release control valve 89 in its lower position in which it is shown in FIG. 1B.

As shown in FIG. 1B, connected to the upper inlet of the double check valve 149 is one end of a pipe 150a that has its opposite end connected to the brake valve device 8 shown in FIG. 1B. Since the two brake valve devices 8 are identical, this pipe 150a is supplied with fluid under pressure from the main reservoir 11 in the manner previously explained in connection with pipe 150.

The hereinbefore-mentioned passageway 112 in the sectionalized casing of valve device 13 opens at the wall surface of a counterbore 153 in this casing. The release control valve 89 is slidably mounted in this counterbore 153 that, adjacent its lower end, is connected by a passageway 154 to the lower end of the bore 91 which is normally vented to atmosphere via passageway and pipe 122, check valve device 123, pipe 124 pipe tee 125, pipe and passageway 126 (FIG. 1A), groove 128 on and passageway 129 in suppression valve 127, chamber 130 and vent passageway 131.

The magnet valve device 20 shown in FIG. 1B of the drawings is provided with a chamber 155 into which opens the hereinbefore-mentioned pipe 139. Disposed in the chamber 155 is a pair of oppositely disposed poppet-type valves 156 and 157 having stems that extend respectively through coaxial bores 158 and 159 into chambers 160 and 161. The valve 157 is shown seated on a valve seat 162 by a plunger or armature 163 of a solenoid 164. When the solenoid 164 is deenergized by opening of a circuit hereinafter described, a spring 165 unseats valve 157 from its seat 162 whereupon fluid under pressure may flow from the chamber 97 above the diaphragm 93 of the brake application valve 13 to atmosphere via passageway 98, branch passageway 98b, lower end of bottomed bore 132, passageway and pipe 139, chamber 155, past unseated valve 157, bore 159, chamber 161, a passageway and correspondingly numbered pipe 166 and a whistle device 167.

The solenoid 164 comprises a coil 168, one end of which is connected by a wire 169 to one terminal of a switch contact 170 that is held in a circuit closing position so long as the engineer maintains the foot pedal 25 of the foot-pedal-operated switch device 21 depressed. The other terminal of switch contact 170 is connected by a wire 171 to one terminal of a battery 172 the opposite terminal of which is connected to ground indicated by the numeral 173.

The other end of the coil 168 is connected by a wire 174 to one terminal of a contact 175 of the hereinbefore-mentioned fluid pressure operated switch device 23. The other terminal of the contact 175 is connected by a wire 176 to ground indicated by the reference numeral 177. The pressure switch device 23, which is connected to the brake pipe 1 by the pipe 24, is so constructed that its contact 175 disconnects wire 174 from wire 176 when the pressure in the brake pipe 1 is reduced from a normal charged value of, for example, seventy-one pounds per square inch to a value of for example, sixty pounds per square inch, and connects the wire 174 to the wire 176 in response to the pressure in the brake pipe 1 and pipe 24 increasing to a value of, for example, sixty-five pounds per square inch.

Connected to the wire 174 intermediate the ends thereof is one end of a wire 178 that has its opposite end connected to one terminal of a contact 179 of the hereinbefore-mentioned fluid pressure operated switch device 22. Connected to the other terminal of this contact 179 is one end of a wire 180 that has its opposite end connected to the above-mentioned wire 176 intermediate the ends thereof. From the foregoing, it is apparent that the contacts 175 and 179 provide two parallel circuits between the coil 168 of solenoid 164 and ground indicated by the numeral 177.

The pressure switch device 22 is so constructed that its contact 179 disconnects wire 178 from wire 180 when fluid under pressure supplied thereto exceeds a value of, for example, one hundred and ten pounds per square inch, and subsequently connects the wire 178 to the wire 180 when the pressure of the fluid supplied to this switch device 22 is reduced to, for example, aa value of ninety pounds per square inch.

By providing a substantial difference between the opening and closing pressures of the pressure switch devices 22 and 23, a less costly switch device may be used than would be the case if the opening and closing pressure of these switch devices were the same.

In order to provide for the supply of fluid under pressure to and the release of fluid under pressure from the switch device 22 to effect the operation thereof, this switch device 22 is connected by a pipe 181 to a reservoir 182 of a chosen volume.

Connected to the pipe 181 intermediate the ends thereof is one end of a short pipe 183 that has its opposite end connected to the inlet of a check valve 184. Connected to the outlet of the check valve 184 is one end of a pipe 185 that has its opposite end connected to the hereinbefore pipe 148 intermediate the ends thereof.

As shown in FIG. 1B, a restriction or choke 186 is connected in bypassing relation to the check valve 184 by having one end connected to the pipe 185 by a pipe 187 and the other end connected to the pipe 181 by a pipe 188. It is apparent that the size of the choke 186 and the volume of the reservoir 182 determine the time required to build up sufficient pressure in the pipe 181 to cause the switch device 22 to open its contact 179.

OPERATION

To initially charge the brake control apparatus shown in FIGS. 1A and 1B of the drawings, diesel engines are started for operating fluid compressors (not shown) to effect charging of the main reservoir 11 to a chosen pressure which may be, for example, 140 pounds per square inch.

It may be assumed that the brake valve device 8 shown in FIG. 1A is to be used by the engineer to control the brakes on the train. Accordingly, the handle 27 of this brake valve device 8 is placed in its release position and the handle 27 of the brake valve device 8 shown in FIG. 1B is placed in its handle off position to render this brake valve device 8 inoperative.

It may be further assumed that a handle 189 of the selector valve 34 of the brake valve device 8 shown in FIG. 1A has been placed in passenger position so that the check valve 115 of the equalizing reservoir cut-off valve 33 of this brake valve device 8 is constantly held unseated in the manner explained in hereinbefore-mentioned U.S. Pat. No. 2,958,561.

Therefore, while the brake valve handle 27 is in its release position, the self-lapping regulating valve 28 of this brake valve device 8 is effective, as explained in the above-mentioned patent, to supply fluid under pressure from the main reservoir 11, which is connected to this regulating valve device via a passageway 190, and passageway and pipe 50, to the equalizing reservoir 17, via passageway 116, past unseated check valve 115, passageway and pipe 114, double check valve 113 (FIG. 1B), pipe and passageway 112, groove 111 on release control valve 89, passageway 110, groove 102 on application valve 87, passageway and pipe 109, pipe 58a and pipe 58 (FIG. 1A). Since chamber 36 of relay valve 19 of the brake valve device 8 is connected to the equalizing reservoir via passageway and pipe 58, fluid under pressure will also flow to the chamber 36. Consequently, the relay valve 19 will operate to effect the supply of fluid under pressure from the supply chamber 49, that is connected to the main reservoir 11 via passageway and pipe 50 to the chamber 43 from whence it will flow to the chamber 52 and unseat cut-off valve 53.

With cut off valve 53 unseated, fluid under pressure supplied to the chamber 52 from the main reservoir 11 will flow past this valve 53 to the passageway 55 and thence through chamber 56 to the passageway and pipe 57 which is connected to the inlet port of the fluid pressure operated three-way valve device 9.

To effect fast charging of the brake pipe 1 and a release of the brakes on the locomotive and the cars in the train, the engineer will now depress the push button 74 of the manually operated valve device 10 shown in FIG. 1A to first move exhaust valve seat 79 into contact with the upper side of valve 66 and thereafter unseat valve 66 from supply valve seat 67.

Since main reservoir 11 is connected to chamber 64 via pipe 50 and pipe and passageway 65, upon the unseating of valve 66, fluid under pressure will flow to the piston of the three-way valve 9 via passageway and pipe 69, double check valve 12, pipe 81, pipe tee 82, pipe 84, volume reservoir 85 and pipe 86, it being noted the volume of the reservoir 85 determines the length of time required for the pressure in the pipe 86 to build up sufficiently to shift the three-way valve 9 in the direction of the left hand from the position in which it is shown in FIG. 1A and denoted by the reference numeral 191 to a position denoted by the reference numeral 192.

When the three-way valve device 9 is thus shifted to the position denoted by the numeral 192, an unrestricted communication is established between the pipe 57 and the brake pipe 1 in bypassing relation to the choke 60 via the valve device 9, pipe 62 and pipe 61.

Consequently, upon the establishment of this unrestricted communication between the pipe 57 and the brake pipe 1, the relay valve 19 of the brake valve device 8 shown in FIG. 1A will supply fluid under pressure to the brake pipe 1 until the pressure in the train brake pipe is charged to the normal pressure carried therein as determined by the setting of an adjusting screw 193 of the regulating valve 28 of the brake valve device 8.

Upon charging of the train brake pipe, the control valve 6 on the locomotive and the control valve on each car in the train will operate in response to this charging of the train brake pipe to effect release of the brakes on the entire train.

When the train brake pipe is fully charged, as indicated to the engineer by a gage (not shown) connected to the brake pipe 1, he will release the push button 74 of the valve device 10 shown in FIG. 1A.

Upon release of the push button 74, the spring 68 will seat valve 66 on valve seat 67, and spring 76 will shift hollow plunger 73 upward to unseat exhaust valve seat 79 from the upper side of valve 66.

Fluid under pressure will now flow from the piston of the three-way valve 9 and the volume reservoir 85 to atmosphere via pipes 86 and 84 and choke 83, and also via pipe 81, double check valve 12, pipe and passageway 69, ports 80, past exhaust valve seat 79 and hollow plunger 73.

After a period of time determined by the size of the choke 83 and the volume of the reservoir 85, the release spring of the valve device 9 will shift it in the direction of the right hand from the position denoted by the reference numeral 192 to the position denoted by the reference numeral 191 thereby establishing a restricted communication between the pipe 57 and the brake pipe 1 via the valve device 9, pipe 59, choke 60 and pipe 61.

The relay valve 19 of the brake valve device 8 (FIG. 1A) is now effective to supply fluid under pressure to the brake pipe 1 at a restricted rate determined by the size of the choke 60.

It will be understood that the size of the choke 60 is sufficient to enable the relay valve 19 to maintain the normal pressure carried in the train brake pipe against the maximum allowable brake pipe leakage.

It will be noted from FIG. 1B that as the brake pipe 1 is charged in the manner described above, fluid under pressure will flow from the brake pipe 1 to the fluid pressure operated switch device 23 via the pipe 24.

As hereinbefore-stated, upon the pressure in the brake pipe 1 and pipe 24 reaching a value of, for example, 65 pounds per square inch, the switch device 23 will operate to cause its contact 175 to connect the wire 174 to the wire 175.

Referring to FIG. 1B, it will be noted that in the absence of fluid under pressure in the reservoir 182 and the pipe 181 that connects this reservoir 182 to the pressure switch device 22, the contact 179 of this pressure switch device 22 connects the wire 178 to the wire 180.

Assuming that the engineer, when he assumed control of the train, depressed the foot pedal 25 of the switch device 21 to the position shown in FIG. 1B, it may be seen that a circuit for engergizing the magnet valve device 20 is established. This circuit extends from ground 173 of the battery 172 to the ground 177 via wire 171, now closed switch contact 170, wire 169, solenoid coil 168, wires 174 and 178, contact 179 of pressure switch device 22, wire 180 and wire 176. With the solenoid 164 of the magnet valve device 20 thus energized, the plunger 163 is forced downward to unseat valve 156 and seat valve 157 on valve seat 162 to prevent flow of fluid under pressure from the pipe 139 to atmosphere via chambers 155 and 161, passageway and pipe 166 and whistle 167.

With valve 157 of magnet value device 20 seated, chamber 97 in the brake application valve device 13 is no longer open to atmosphere via passageways 98 and 98b, bottomed bore 132, passageway and pipe 139, chamber 155, past valve 157 if it were unseated, chamber 161, passageway and pipe 166 and whistle 167.

Consequently, fluid under pressure will flow from the main reservoir 11 to the chamber 94 below diaphragm 93 of valve device 13 via pipe 50, and pipe and passageway 95.

Moreover, fluid under pressure will flow from pipe 95 to the chamber 97 above the diaphragm 93 via choke 99 and passageway 98. Therefore, when the chambers 94 and 97 are charged to the pressure carried in the main reservoir 11, the spring 96 is rendered effective to bias the application valve 87 to the position shown in FIG. 1B.

While the handle 27 of the brake valve device 8 occupies its release position, the spool valve 127 of suppression valve 32 of this brake valve device is biased to the position shown in FIG. 1A by a spring 194. Accordingly, it may be seen from FIGS. 1A and 1B that fluid under pressure can flow from the main reservoir 11 to the reservoir 182 and pressure switch device 22 via pipe and passageway 50, passageway 152, the left-hand end of bore 151, passageway and pipe 150, double check valve 149, pipes 148, 185 and 187, choke 186 and pipes 188 and 181.

Therefore, it is apparent that when the engineer moves the handle 27 to its release position, fluid under pressure is supplied to the pressure switch device 22 and the reservoir 182 via the pathway just described, and the relay valve 19 simultaneously supplies fluid under pressure to the brake pipe 1, pipe 24 and the pressure switch device 23. However, the size of the choke 186 and the volume of the reservoir 182 are such that the fluid under pressure supplied to the pressure switch device 23 from the brake pipe 1 will build up sufficient pressure to cause this switch device 23 to close its contact 175 to connect wire 174 to 176 before sufficient pressure is built up in the volume reservoir 182 and pipe 181 to cause the pressure switch device 22 to open its contact 179 to disconnect wire 178 from wire 180. Accordingly, it is apparent that, during charging of the brake pipe 1 to effect a brake release, the magnet valve device 20 remains energized.

As hereinbefore stated, subsequent to charging the train brake pipe to the pressure normally carried therein and affecting a release of the brakes on the entire train, the three-way valve device 9 connects the pipe 57 to the brake pipe 1 via the restriction or choke 60 so that the relay valve 19 of the brake valve device 8 can supply fluid under pressure to the brake pipe 1 only at a restricted rate determined by the size of this choke 60.

BREAK-IN-TWO FULL SERVICE APPLICATION OF BRAKES

Let it be supposed that, while the brakes are released and the train is traveling along a track, a train separation or break-in-two occurs in the train at a location that is remote from the locomotive. It is apparent that a rupture of the train brake pipe occurs at the point of break-in-two so that fluid under pressure is released to atmosphere from the train brake pipe of both sections of the train.

Considering now the section of the train brake pipe between the point of rupture and the locomotive, it will be apparent that fluid under pressure will be released from this section of the train brake pipe to atmosphere at the point of rupture at a faster rate that the relay valve 19 of the brake valve device 8 (FIG. 1A) on the locomotive can supply fluid under pressure to the train brake pipe via the choke 60. Consequently, the pressure in this section of the train brake pipe will reduce by flow of fluid under pressure therefrom to atmosphere via the point of rupture.

As the pressure in this portion of the train brake pipe is thus reduced, the brake control valve device 6 on the locomotive and the brake control valve device on each car in the train between the locomotive and the location of the break-in-two will operate in response to this reduction of train brake pipe pressure to effect a brake application on the locomotive and these cars.

At the time a break-in-two occurs, the contact 179 of the pressure switch device 22 is open and the contact 175 of the pressure switch device 23 is closed so that the magnet valve device 20 is energized to prevent the release of fluid under pressure from the pipe 139 to atmosphere.

Upon the occurrence of a break-in-two, fluid under pressure will be released from the pressure switch device 23 to atmosphere via pipe 24, brake pipe 1, and the train brake pipe extending through those cars between the locomotive and the point of break-in-two.

Assuming that the pressure normally carried in the train brake pipe is, for example, seventy-one pounds per square inch, then when the pressure in the brake pipe 1, pipe 24 and switch device 23 is reduced to the hereinbefore-mentioned pressure of sixty pounds per square inch, the switch device 23 operates to open its contact 175 thereby disconnecting wire 174 from wire 176 to effect deenergization of the magnet valve device 20.

Upon deenergization of the magnet valve device 20, the spring 165 is rendered effective to unseat valve 157 from its seat 162. Upon unseating of valve 157 from its seat 162, fluid under pressure will flow from the chamber 97 above the diaphragm 93 of the brake application valve device 13 and the timing reservoir 121 to atmosphere via passageway 98, branch passageway and pipe 98a, branch passageway 98b, bottomed bore 132, passageway and pipe 139, chamber 155 in magnet valve device 20, past unseated valve 157, bore 159, chamber 161, passageway and pipe 166 and the whistle 167 at a faster rate than fluid under pressure from the main reservoir 11 can be supplied to the chamber 97 via the choke 99.

Since the main reservoir 11 is connected to the chamber 94 below the diaphragm 93 via pipe 50 and pipe and passageway 95, it is apparent that the reduction of the pressure in the chamber 97 above the diaphragm 93 will quickly establish a sufficient differential of pressure on this diaphragm to deflect it in an upward direction against the yielding resistance of the spring 96 until a diaphragm follower plate 195 abuts a stop 196 formed on the cover 138.

This upward deflection of the diaphragm 93 is effective to shift the application valve 87 upward from the position shown to a second position in which the following communications are established.

While in its second position, the groove 100 on the brake application valve 87 establishes a communication between branch passageway 95b and passageway and pipe 104. Consequently, fluid under pressure will flow from the main reservoir 11 to the passageway and pipe 104 via pipe 50, pipe and passageway 95, branch passageway 95b and groove 100 on valve 87.

It will be noted from FIG. 1B that (1) the power cut-out switch device 14 is connected to the pipe 104 by the branch pipe 104a; (2) the dynamic brake cut-out switch device 15 is connected to this pipe 104 by the branch pipe 104b; and (3) the switch device 16 for operating the rail sanding apparatus is also connected to this pipe 104 by the branch pipe 104c.

Consequently, upon operation of the brake application valve device 13 in response to a train separation or break-in-two at a location remote from the locomotive, (1) the power cut-out switch device 14 operates to cut off the propulsion power of the locomotive, (2) the dynamic brake cut-out switch device 15 opens the dynamic brake circuit to cut out the locomotive dynamic brakes, and (3) the switch device 16 operates to cause sanding of the rails.

Moreover, when the brake application valve 87 is shifted to its second position, the groove 102 thereon connects the passageway 107 to the passageway and pipe 109. Therefore, fluid under pressure will flow from the equalizing reservoir 17 and the chamber 36 of the relay valve 19 of brake valve device 8 shown in FIG. 1A to the reduction reservoir 18 via passageway and pipe 58, pipe 58a, pipe and passageway 109, groove 102 on valve 87, passageway 107, choke 108, and passageway and pipe 106. The volume of the reduction reservoir 18 is such that when the chamber 36 and the equalizing reservoir 17 are connected to this reduction reservoir 18, the pressure in the chamber 36 and the equalizing reservoir 17 is reduced sufficiently to cause the relay valve 19 to operate to reduce the pressure in the train brake pipe to the pressure required to effect a full service brake application on the train.

From the foregoing, it is apparent that the operation of the relay valve 19 to release fluid under pressure from the train brake pipe to atmosphere in response to the reduction of the pressure in the chamber 36 and the equalizing reservoir 17 by flow to the reduction reservoir 18 via the brake application valve 13 hastens the operation of the brake control valve device 6 on the locomotive and the brake control valves on the cars between the locomotive and the point of rupture to effect a full service brake application since fluid under pressure is released from one end of the train brake pipe at the point of rupture and from the other end of this train brake pipe at the relay valve 19 of the brake valve device 8 on the locomotive.

RELEASE OF A BREAK-IN-TWO SERVICE APPLICATION OF BRAKES

In order to release the above-described full service brake application effected in response to a break-in-two or train separation, the engineer will move the handle 27 of the brake valve device 8 shown in FIG. 1A from its release position to its suppression position.

As is explained in hereinbefore-mentioned U.S. Pat. No. 2,958,561, when the handle 27 is moved to its suppression position, a cam 197, carried on a cam shaft 198 on which the handle 27 is mounted, shifts at suppression valve 127 from the position in which it is shown in FIG. 1A to a suppression position.

When the suppression valve 127 is shifted to its suppression position, the groove 128 on this valve 127 registers with the end of passageway 150. Consequently, fluid under pressure will not be released from the reservoir 182 (FIG. 1B) and the pressure switch device 22 to atmosphere at a fast rate via pipes 181 and 183, check valve 184, pipes 185 and 148, double check valve 149, pipe and passageway 150 (FIG. 1A), groove 128 on and passageway 129 in suppression valve 127, bore 151, chamber 130 and vent passageway 131.

When fluid under pressure is thus released from the pressure switch device 22, it will operate to cause its contact 179 to connect wire 178 to wire 180.

It will be understood that the engineer has not removed his foot from the foot pedal 25 of the switch device 21. Therefore, when contact 179 connects wire 178 to wire 180, the circuit is completed for reenergizing solenoid coil 168 of magnet valve device 20. Consequently, magnet valve device 20 now operates to seat valve 157 on its seat 162 to close communication between pipe 139 and atmosphere via whistle 167.

Moreover, when the suppression valve 127 is moved to its suppression position, communication is closed between passageway 126 and atmosphere via groove 128 on and passageway 129 in suppression valve 127, bore 151, chamber 130 and vent passageway 131.

It being remembered that application valve 87 is in its upper position so that fluid under pressure supplied from the main reservoir 11 through the choke 99 to the passageway 98 and branch passageway 98c flows into the lower end of the bore 91 and thence via pipe and passageway 122 and check valve 123 to the pipe 126, it is apparent that closing the communication between the passageway 126 and atmosphere cuts off flow of fluid under pressure from the lower end of the bore 91 to atmosphere.

Therefore, the fluid under pressure supplied from the main reservoir through the choke 99 flows to the chamber 97 above the diaphragm 93 via the passageway 98. Since fluid under pressure is supplied from the main reservoir 11 to the chamber 94 below diaphargm 93 via pipe 50, and pipe and passageway 95, the pressure in chambers 97 and 94 quickly become the same whereupon the spring 96 is rendered effective to deflect the diaphragm 93 downward thereby returning the application valve 87 to the position shown in FIG. 1B.

Subsequent to the reenergization of the magnet valve device 20 and the return of the application valve 87 of the brake application valve device 13 to the position shown, the engineer will return the handle 27 of the brake valve device 8 shown in FIG. 1A from its suppression position back to its release position thereby effecting return of the suppression valve 127 to the position in which it is shown in FIG. 1A.

Upon return of the suppression valve 127 to the position shown in FIG. 1A, fluid under pressure will flow from the main reservoir 11 to the volume reservoir 182 and the pressure switch device 22 via the pathway previously described.

Furthermore, upon return of the application valve 87 to the position shown, the regulating valve 28 of the brake valve device 8 shown in FIG. 1A is connected to the equalizing reservoir 17 and chamber 36 in relay valve 19 via pathways previously described.

Since the handle 27 of the brake valve 8 has been returned to its release position, the relay valve 19 will now operate to supply fluid under pressure from the main reservoir 11 to the passageway and pipe 57.

To effect a quick release of the brakes on the train, the engineer will now depress the push button 74 of the manually operated valve device 10 shown in FIG. 1A to effect the supply of fluid under pressure to the three-way valve device 9 in the manner previously described. This three-way valve device 9 will now operate to connect the pipe and passageway 57 to the brake pipe 1 in bypassing relation to the choke 60 to enable a fast build up of pressure in the train pipe to the normal pressure carried therein.

The brake control valve device 6 on the locomotive and the brake control valves on the cars coupled thereto will now operate in response to this recharging of the train brake pipe to effect a brake release on each respective vehicle in the train.

It will be noted that fluid under pressure supplied to the brake pipe 1 to effect a brake release will flow to the pressure switch device 23 (FIG. 1B) via the pipe 24. Since this pressure switch device 23 operates at a pressure of 65 pounds per square inch to cause its contact 175 to connect wire 174 to wire 176 and the pressure switch device 22 operates at a pressure of one hundred and ten pounds per square inch to cause its contact 179 to disconnect wire 178 from the wire 180, it is apparent that contact 175 closes before contact 179 opens so that the magnet valve device 20 is not deenergized to cause operation of the brake application valve 13 when a brake release is effected subsequent to a service brake application at the time of a break-in-two or train separation.

MANUALLY EFFECTED APPLICATION OF BRAKES

To effect a service brake application on the locomotive and the cars hauled thereby, the engineer will manually move the handle 27 of the brake valve devices 8 that he is using to control the brakes on the train arcuately out of its release position and to a position in its application zone in which the self-lapping relay valve 19 of the brake valve device 8 is effective to cause a reduction of pressure in the train brake pipe to a degree corresponding to the position in its application zone to which the handle 27 is moved.

As the pressure in the train brake pipe is reduced, the brake control valve device 6 on the locomotive and the brake control valve on each car in the train operates in response to this reduction of pressure in the train brake pipe to effect a brake application on each respective vehicle corresponding in degree to the degree of reduction of the pressure in the train brake pipe.

As the brake valve handle 27 is manually moved arcuately from its release position to the above-described position in its application zone, the cam shaft 198, on which the cam 197 is mounted and to which the handle 27 is secured, and the cam 197 are rotated therewith. The contour of the cam 197 is such that this rotation is effective to move the suppression valve 127 against the bias of the spring 194 from the position in which this valve 127 is shown in FIG. 1A in the direction of the left hand to a position in which the groove 128 on this valve 127 registers with the passageway 150.

Fluid under pressure will now be vented from the volume reservoir 182 and the pressure switch device 22 to atmosphere via the pathway hereinbefore described.

Since the relay valve 19 is now operating to reduce the pressure in the train pipe, it is apparent that the pressure in the switch device 23 is likewise being reduced since this device 23 is connected to the brake pipe 1 via the pipe 24.

Since the pressure switch device 22 closes its contact 179 upon the pressure therein being reduced to the hereinbeforementioned value of 90 pounds per square inch, and the pressure switch 23 opens its contact 175 upon the pressure therein being reduced to the hereinbefore-mentioned value of 65 pounds per square inch, it is apparent that contact 179 is closed prior to opening of contact 175.

Accordingly, it is apparent that the circuit for energizing the coil 168 of the solenoid 164 is not opened. Consequently, the magnet valve device 20 remains energized to prevent operation of the brake application valve device 13 when the engineer effects a brake application by manual operation of handle 27 of the brake valve device 8.

SAFETY CONTROL APPLICATION OF BRAKES

Should the engineer become incapacitated so that he is no longer able to maintain the pedal 25 of the foot pedal operated switch device 21 depressed against the yielding resistance of the spring 26, this spring 26 will effect counterclockwise rocking of the pedal 25 to cause the contact 170 of this switch device 21 to disconnect wire 171 from wire 169 thereby effecting deenergization of the magnet valve device 20.

This magnet valve device 20 will now operate to vent fluid under pressure from the pipe 139 to atmosphere whereupon the brake application valve device 13 will operate in the manner hereinbefore described to cause (1) cut off of the propulsion power of the locomotive; (2) opening of the dynamic brake circuit; (3) sanding of the rails; and (4) a full service brake application on the locomotive and all the cars in the train.

Having now described the invention what I claim as new and desire to secure by Letters Patent, is:

1. In a locomotive brake control apparatus, the combination of:
    a. a brake pipe extending from end to end of the locomotive and connected to a corresponding brake pipe extending through the cars in a train hauled by said locomotive,
    b. a multi-position brake valve device operable to vary the pressure in said brake pipe,
    c. a brake cylinder operable to effect a brake application and a subsequent brake release on the locomotive
    d. a control valve device connected to and operable in response to variations of pressure in said brake pipe to control the supply of fluid under pressure to and the release of fluid under pressure from said brake cylinder,
    e. a fluid pressure operated locomotive power supply cutoff device, wherein the improvement comprises:
    f. a brake application valve device operable upon the release of fluid under pressure therefrom to effect the supply of fluid under pressure to said power supply cut-off device to cause operation thereof to cut off the supply of power to the locomotive,
    g. an electro-responsive valve means operable upon deenergization thereof to release fluid under pressure from said brake application valve device, and
    h. circuit means for controlling energization and deenergization of said electro-responsive valve means, said circuit means comprising:
        (i) two parallel-arranged circuits,
        (ii) a first fluid-pressure-operated switch device having a contact for effecting closing one of said two parallel-arranged circuits in response to an increase in the pressure in said brake pipe to a first chosen value, and opening said one circuit in response to a reduction of the pressure in said brake pipe to a second chosen value that is less than said first chosen value, and
        (iii) a second fluid-pressure-operated switch device having a contact for effecting opening of the other of said two parallel-arranged circuits by a first pressure that is in excess of said first chosen pressure in response to movement of said multi-position brake valve device to one of its positions, and closing said other circuit by a second pressure that is less than said first chosen pressure but in excess of said first chosen value in response to movement of of said multi-position brake valve device to another of its positions.

2. A locomotive brake control apparatus, as recited in claim 1, further characterized by means selectively operable to enable said multi-position brake valve device to vary the pressure in said brake pipe at two different rates.

3. A locomotive brake control apparatus, as recited in claim 1, further characterized by means interposed between said brake valve device and said brake pipe to provide two parallel communications therebetween, one of which is restricted, and fluid pressure operated means for selectively establishing one or the other of said two parallel communications.

4. A locomotive brake control apparatus, as recited in claim 1, further characterized by a fluid pressure operated dynamic brake cut-out switch device, and by means enabling the supply of fluid under pressure thereto upon operation of said brake application valve device to effect the supply of fluid under pressure to said power cut-off device.

5. A locomotive brake control apparatus, as recited in claim 1, further characterized by a fluid pressure operated rail sanding control switch device, and by means enabling the supply of fluid under pressure thereto upon operation of said brake application valve device to effect the supply of fluid under pressure to said power cut-off device.

6. A locomotive brake control apparatus, as recited in claim 1, further comprising:
   a. a fluid pressure operated dynamic brake cut-off switch device,
   b. a first conduit means enabling the supply of fluid under pressure to said dynamic brake cut-out switch device upon operation of said brake application valve device to effect the supply of fluid under pressure to said power cut-off device,
   c. a fluid pressure operated rail sanding control switch device, and
   d. a second conduit means enabling the supply of fluid under pressure to said rail sanding control switch device upon operation of said brake application valve device to effect the supply of fluid under pressure to said power cut-off device.

7. A locomotive brake control apparatus, as recited in claim 1, further characterized in that said circuit means further comprises a switch device having a contact for effecting deenergization of said electro-responsive means in response to incapacitation of the locomotive engineer.

8. A locomotive brake control apparatus, as recited in claim 1, further comprising:
   a. a volume reservoir connected to said second pressure operated switch device,
   b. choke means restricting the rate of flow of fluid under pressure to said volume reservoir and said second pressure operated switch device, and
   c. a one-way flow valve device arranged in bypassing relation to said choke means and so cooperating therewith as to provide for a restricted flow of fluid under pressure to said volume reservoir and said second fluid pressure-operated switch device and an unrestricted flow of fluid under pressure therefrom whereby said first fluid pressure-operated switch device effects closing of its contact in response to an increase in the pressure in said brake pipe prior to said second fluid pressure-operated switch device effecting opening of its contact in response to movement of said multi-position brake valve device from its said another position to its said one position.

9. A locomotive brake control apparatus, as recited in claim 3, further characterized in that said means interposed between said brake valve device and said brake pipe to provide two parallel communications therebetween comprises:
   a. a first conduit having two ends one of which is connected to said brake pipe,
   b. a second conduit having two ends one of which is connected to said brake pipe, and
   c. A choke disposed in said second conduit intermediate the ends thereof, and said fluid pressure operated means comprises a two-position valve device, that while in one of its said two positions, connects said brake valve device to the other end of said second conduit, and, while in the other of its said two positions, connects said brake valve device to the other end of said first conduit.

10. A locomotive brake control apparatus, as recited in claim 8, further characterized in that said one-way flow valve device enables said second fluid-pressure-operated switch device to effect closing of its contact prior to said first fluid-pressure-operated switch device effecting opening of its contact in response to a decrease of pressure in said brake pipe upon movement of said multi-position brake valve device from its said one position to its said other position.

11. A locomotive brake control apparatus, as recited in claim 9, further characterized by manually operable means for effecting the supply of fluid under pressure to effect operation thereof from its said one position to its said other position.

12. A locomotive brake control apparatus, as recited in claim 11, further characterized by a reservoir of a chosen volume connected to said two-position valve device and supplied with fluid under pressure upon operation of said manually operable means, and choke means of a chosen size controlling flow of fluid under pressure from said volume reservoir to atmosphere whereby the chosen volume of said reservoir in cooperation with the chosen size of said choke means determines the time said two-position valve device remains in its said other position subsequent to termination of the supply of fluid under pressure to said two-position valve device by said manually operable means.

* * * * *

UNITED STATES PATENT AND TRADEMARK OFFICE
CERTIFICATE OF CORRECTION

PATENT NO. : 3,982,791
DATED : September 28, 1976
INVENTOR(S) : Esmet Walley

It is certified that error appears in the above-identified patent and that said Letters Patent are hereby corrected as shown below:

Column 19, line 32, change "cut-off" to --cut-out--

Column 20, line 44, before "effect" insert --said fluid pressure operated two-position valve device to--

Signed and Sealed this

Seventeenth Day of May 1977

[SEAL]

Attest:

RUTH C. MASON
*Attesting Officer*

C. MARSHALL DANN
*Commissioner of Patents and Trademarks*